March 14, 1933.    P. R. FORMAN    1,901,711
CLOSURE OPERATING AND LOCKING DEVICE
Original Filed Oct. 22, 1930    12 Sheets-Sheet 6
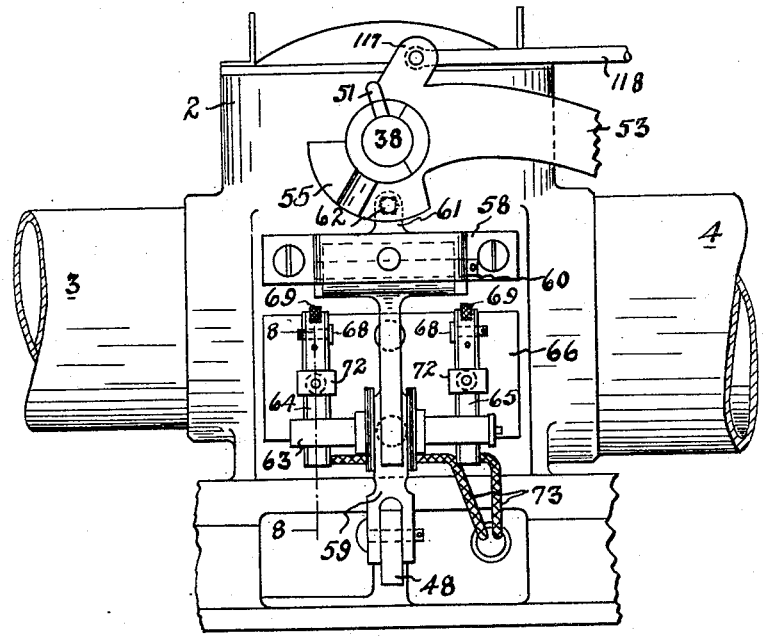
Fig. 6.
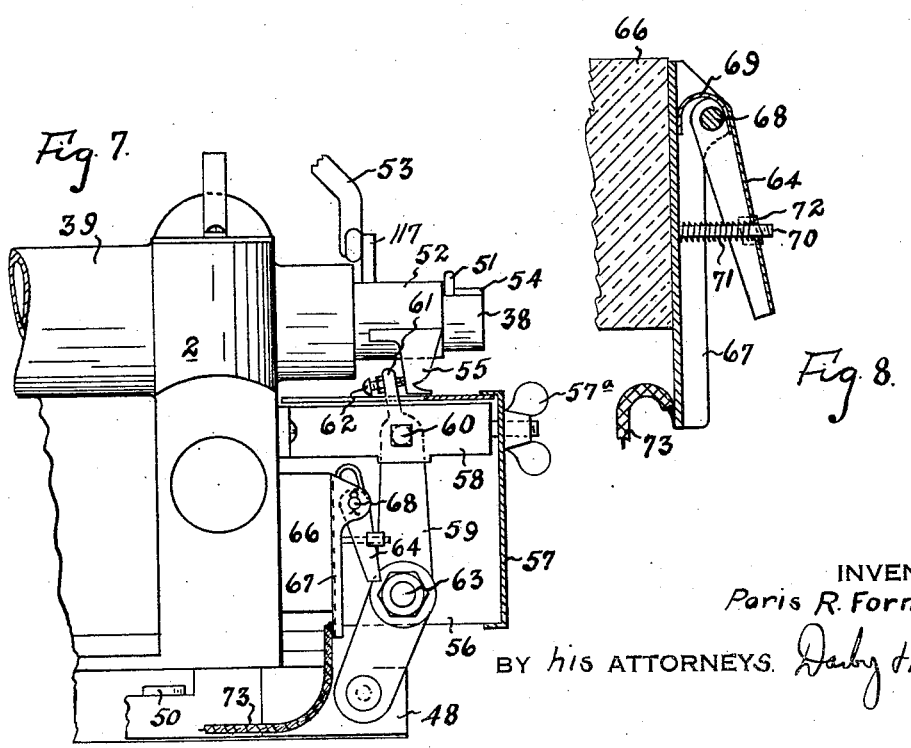
INVENTOR
Paris R. Forman
BY his ATTORNEYS. Darby & Darby March 14, 1933. P. R. FORMAN 1,901,711
CLOSURE OPERATING AND LOCKING DEVICE
Original Filed Oct. 22, 1930 12 Sheets-Sheet 7

INVENTOR
Paris R. Forman
BY Darby & Darby
ATTORNEYS

March 14, 1933.   P. R. FORMAN   1,901,711
CLOSURE OPERATING AND LOCKING DEVICE
Original Filed Oct. 22, 1930   12 Sheets-Sheet 8
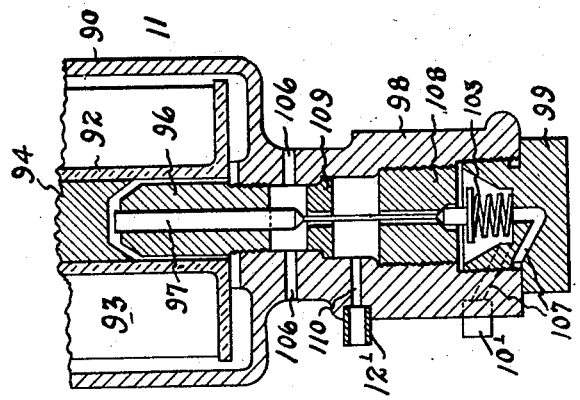
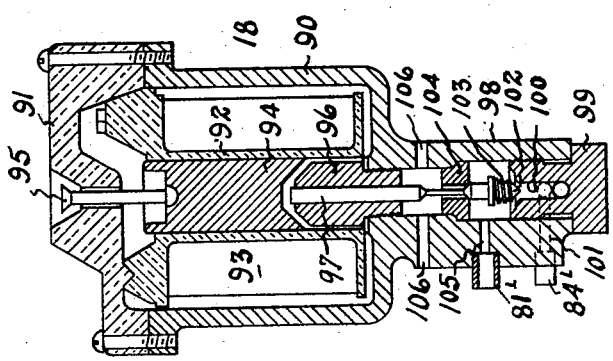
INVENTOR
*Paris R. Forman*
BY his ATTORNEYS. *Darby & Darby*

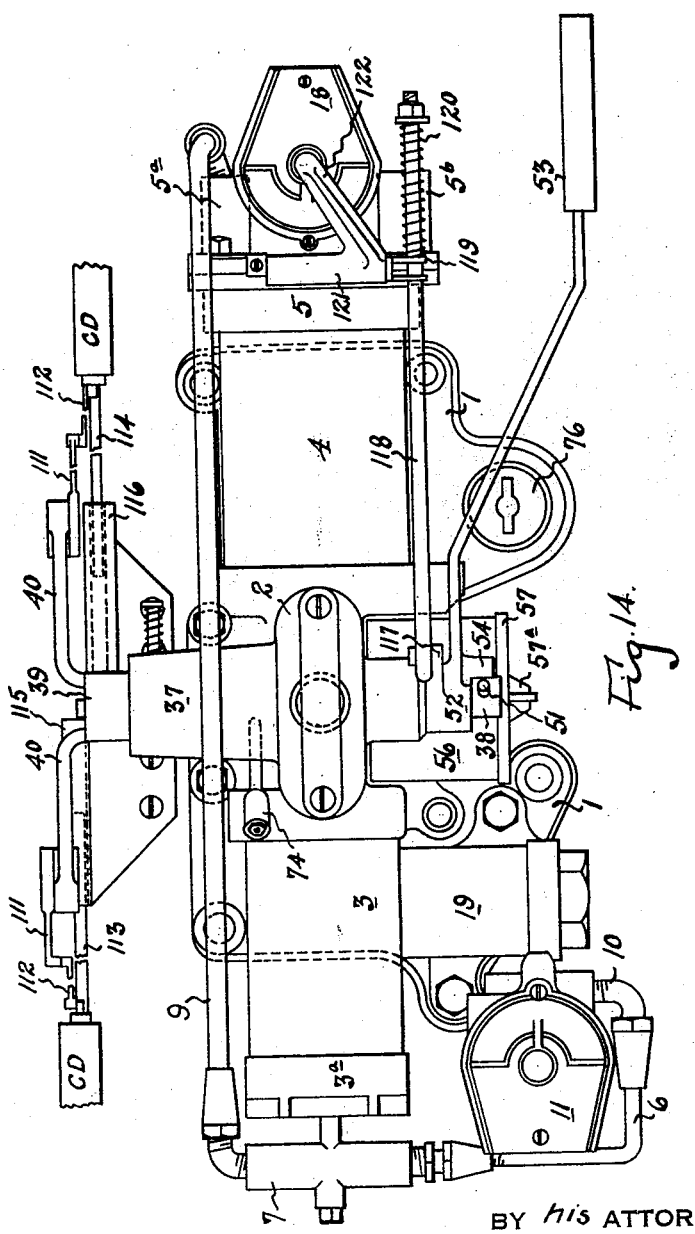

March 14, 1933.  P. R. FORMAN  1,901,711
CLOSURE OPERATING AND LOCKING DEVICE
Original Filed Oct. 22, 1930  12 Sheets-Sheet 10
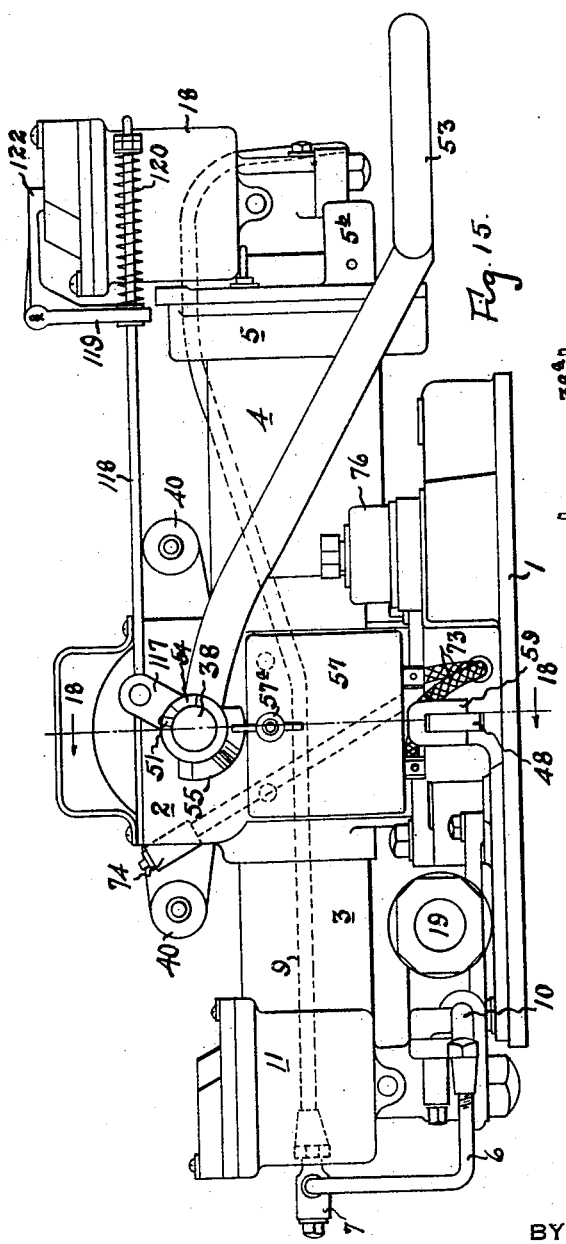
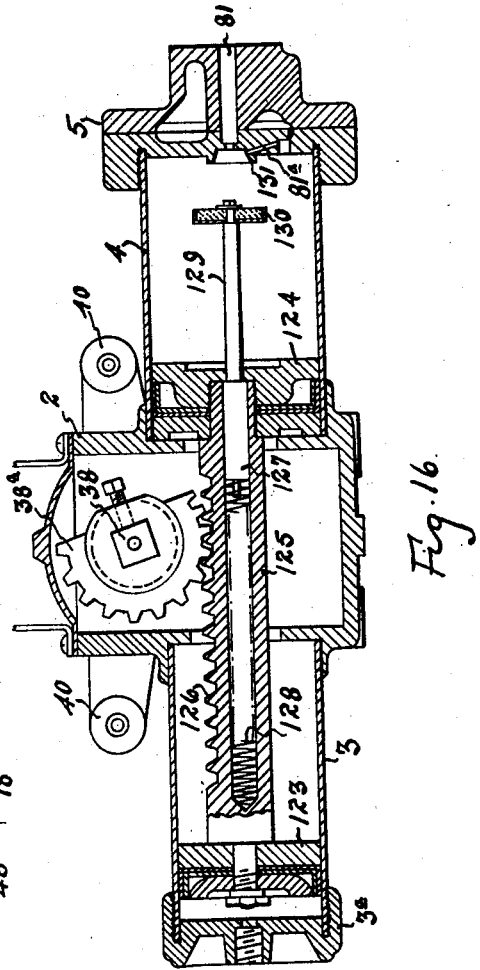
INVENTOR
*Paris R. Forman*
BY his ATTORNEYS.

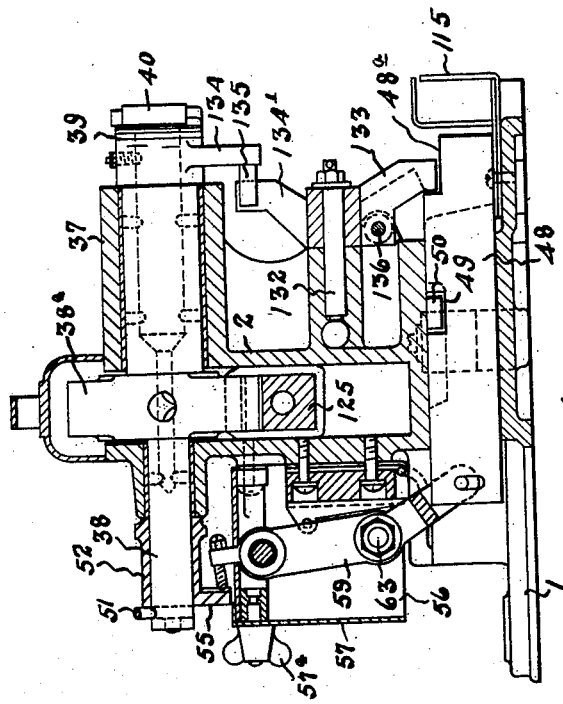
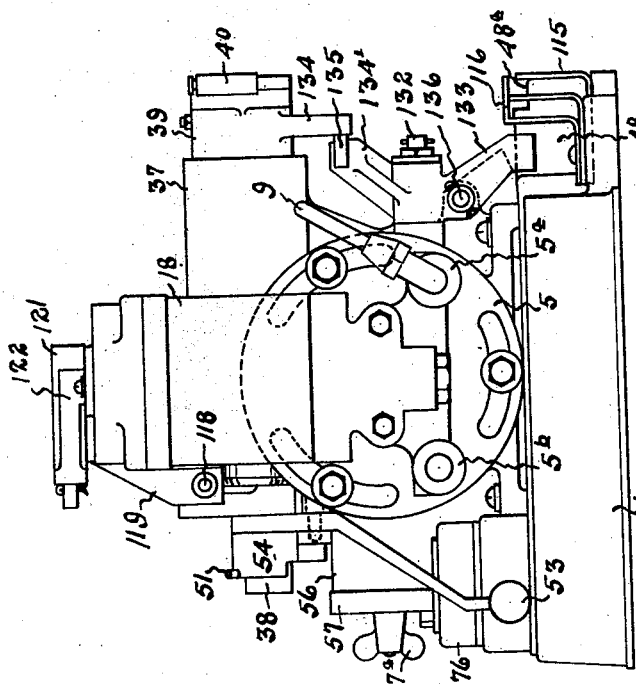

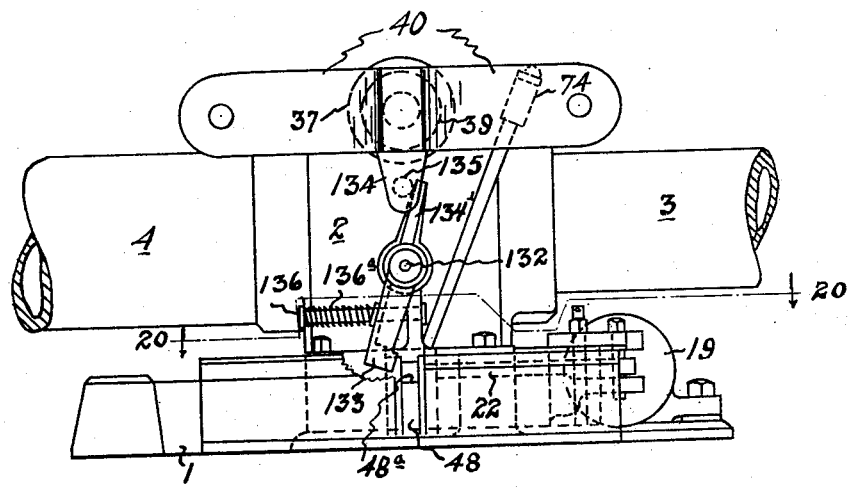

Patented Mar. 14, 1933

1,901,711

UNITED STATES PATENT OFFICE

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA

CLOSURE OPERATING AND LOCKING DEVICE

Original application filed October 22, 1930, Serial No. 490,459. Divided and this application filed July 24, 1931. Serial No. 552,902.

This invention relates to improvements in pneumatic engines and the combination with doors to be operated thereby.

One of the objects of this invention is to provide a new and novel form of pneumatic engine in conjunction with control valves therefor and a locking mechanism in the form of a unitary structure.

A further object of this invention is the provision of pneumatic engines in combination with doors having connections between them to permit the doors to yield during closing if they should strike an obstruction so that the doors stop even though the engine continues to urge them to closed position.

A further object of this invention is to provide such connections of a nature that if a person is caught in the doors the doors may be manually forced apart to permit his release.

A further object of this invention is the provision of manually actual means forming part of the engines by means of which the doors may be opened sufficiently thereby so that they can be fully opened thereafter by direct pressure thereon.

Another object of this invention is the provision of pneumatic engines having manually actual means for operating them independently of the normal controls therefor to open the doors especially in an emergency.

A further object of the invention involves a mechanism forming part of the pneumatic engine of this invention by means of which the doors may first be unlocked manually before they are opened either manually or by means of the engines.

A still further object of this invention is the provision of pneumatic motors so constructed that they may be readily applied to vehicles having a plurality of doors on each side comprising oppositely slidable sections.

A more specific object of the invention is the provision of a pneumatic engine for operating the last section of the end doors of the car.

Another specific object of the invention is the provision of a pneumatic engine constructed to operate the intermediate sections of the remaining doors.

These and many other objects as will appear from the following disclosure are successfully obtained by means of this invention.

This invention resides substantially in the combination, construction, arrangement and relative location of parts all as will be set forth in greater detail below.

This application is a division of my copending application Serial No. 490,459 filed October 22, 1930 for door control system.

Referring to the drawings—

Fig. 6 is an enlarged elevational view of the signalling control switch. This switch, which is mounted on both the end door engines and the center door engines is of the same construction in both cases;

Fig. 7 is a side elevational view of this switch taken on a cross-sectional plane through the side of the switch casing;

Fig. 8 is a cross-sectional view taken on the line 8—8 of Fig. 6;

Fig. 11 is a cross-sectional view taken on the line 11—11 of Fig. 9;

Fig. 12 is a vertical cross-sectional view of the electro-magnetically operated control valve for the engines;

Fig. 13 is a similar but enlarged view with some parts broken away of the electro-magnetic control valve for like operating means;

Fig. 14 is a top plan view of the center door engine;

Fig. 15 is a side elevational view of this engine;

Fig. 16 is a vertical longitudinal cross-sectional view through the cylinders of this engine;

Fig. 17 is an end elevational view of the center door engine;

Fig. 18 is a vertical cross-sectional view taken on the line 18—18 of Fig. 15;

Fig. 19 is an enlarged detail view of the locking mechanism for the center door engine; and Fig. 20 is a cross-sectional view taken on the line 20—20 of Fig. 19.

The nature of this invention will be particularly described in connection with passenger vehicles of the type employed, for example, in modern subway systems. The invention is not limited to such a field of use but is described in connection therewith as one form which it may take.

The engines of this invention have been illustrated in a form which adapts them for use on passenger vehicles having a plurality of doors on each side comprising absolutely slidable sections, it being assumed for purposes of explanation that each car has four doors on each side. For such a layout two end door engines would be employed each operating the last section of the last door on each side. Three center door engines would be employed—one mounted between the first and second doors, another between the second and third, and another between the third and fourth doors. Each center door engine is connected to the adjacent sections of adjacent doors so that each operates two door sections. All this will be apparent from the detailed description in connection with the drawings. The engines disclosed in this application are pneumatic engines and preferably of the differential type.

The engines comprise as unitary structures the engine, proper locking mechanism for locking the doors to be operated thereby in closed position and signalling mechanism for controlling signal circuits for indicating not only when the doors are closed but also when they are locked. The association of these engines with the necessary control and signalling apparatus is fully disclosed in my copending application noted above. The complete system forms no part of this invention since it is restricted to the engine structures.

*End door engine*

Figure 1:
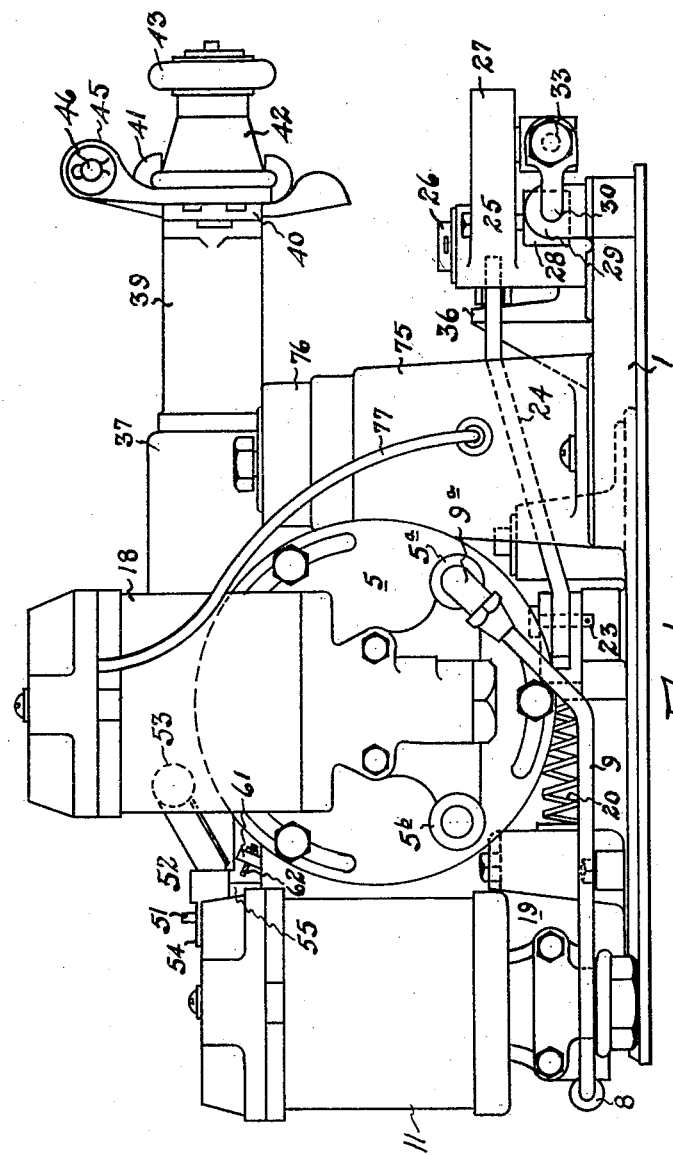
Figure 1 is an end elevational view of an end door engine.
Figure 2:
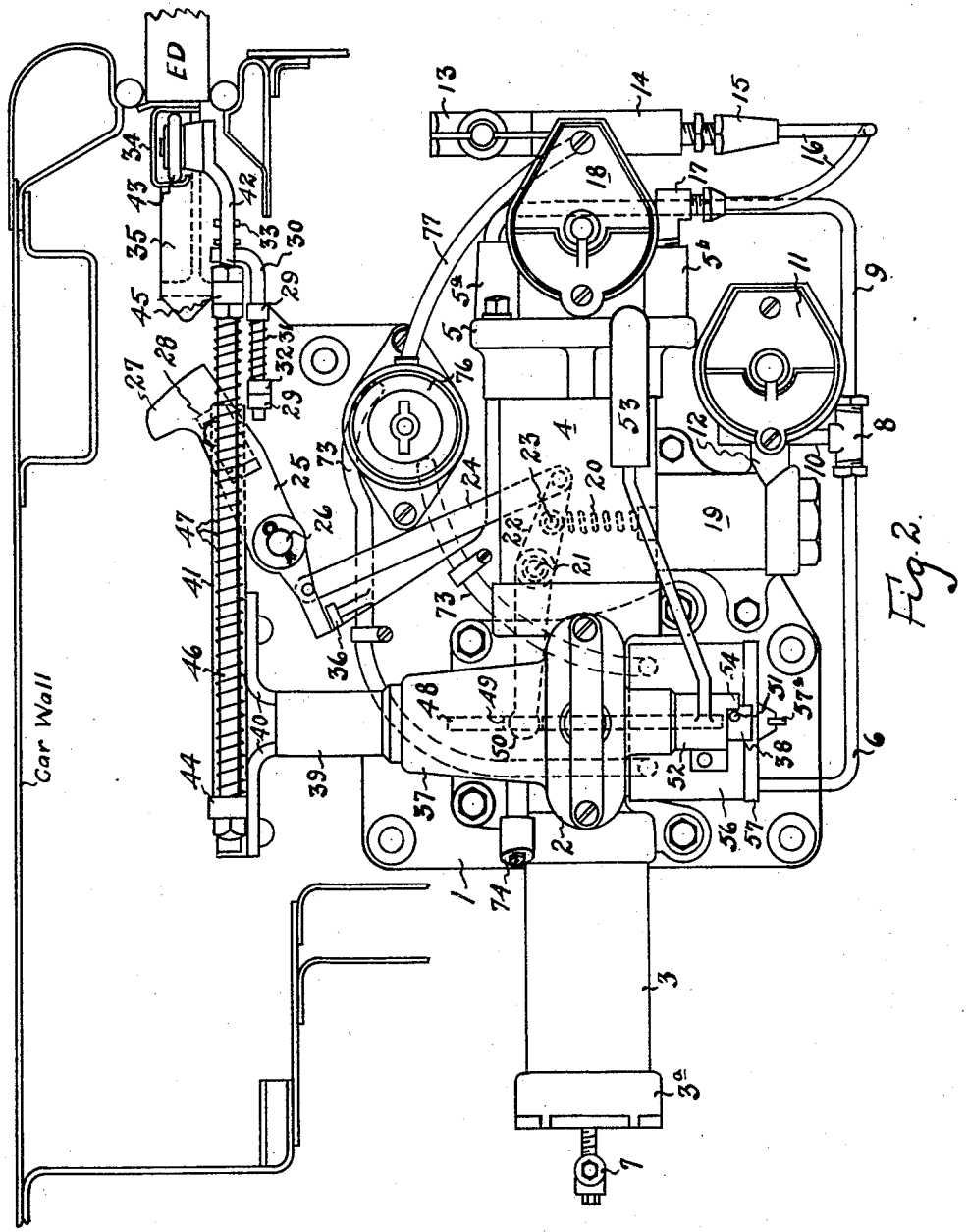
Fig. 2 is a top plan view of the end door engine.

The end door engine is shown in full detail in Figs. 1 to 13 inclusive. It comprises a suitably formed supporting base 1 which has mounted thereon a central casing 2 in which is secured in alignment a small cylinder 3 and a large cylinder 4. The small cylinder is closed by means of the cylinder head $3^a$ and the large cylinder is closed by means of the cylinder head 5 having the bored internally threaded nipples $5^a$ and $5^b$. Fluid pressure supply pipe 6 is connected to the small cylinder 3 through a cushioning device 7 of which many forms are known in the art. Pipe 6 extends to a T 8 which, in turn, is connected by pipe 9 to nipple $5^a$ as shown in Fig. 2. The T is connected by pipe 10 to the electro-magnet valve 11 which will be described in detail later. This valve is also connected by a connection 12 to a lock cylinder 19. At 13 is another form of valve to which the pipe from the fluid pressure source is connected. The outlet of this valve is connected to an air strainer 14 of any suitable form which in turn, is connected by the coupling device 15 to pipe 16. Pipe 16 is connected by an L 17 to the nipple $5^b$. The electro-magnet valve 18 is mounted on the large cylinder head 5. The various passages in the electro-magnet valves and in the cylinder head 5 will be described in detail later.

The lock cylinder 19 is an ordinary cylinder having a piston therein, a piston rod extending from the cylinder and connected to a closely wound coil spring 20. Within the lock cylinder is a coil spring lying between the forward face of the piston therein and the forward end of the cylinder to normally urge the piston towards the rear end of the cylinder. The closely wound spring 20 provides a flexible connection to a lever 22 at 23 pivotally supported on the base 1 at 21. One end of the lever 22 is pivotally connected by a link 24 to a latch lever 25 which likewise is pivotally supported upon the base at 26. The lock lever 25 is provided with a right angle extension 27 having a rounded nose as shown. A cam lug 28 is mounted upon the lock lever 25 and depends therefrom as clearly shown in Fig. 4. At 29 are bored standards mounted on the base in which is slidably mounted an L shaped rod 30 provided with a collar 32 between which and one of the studs 29 a coil spring 31 lies. The end of rod 30 is provided with a longitudinally adjustable screw 33 which may be locked at any position on the rod. The rear edge of the section of the end door operated by the end door engine is shown in Fig. 2 at ED. It will be remembered that this is a top plan view of the mechanism associated with the door looking down on the top edge of the door. The rear edge of the door section is provided with a vertically extending channel 34 and a rearwardly horizontally extending arm 35. The engine is mounted with respect to the door so that the arm 35 is in the path of the locking lever 25 when it is extended to locking position as shown in Fig. 2. A stop 36 formed on the base limits the movement of this locking lever into locking position.

Figure 3:
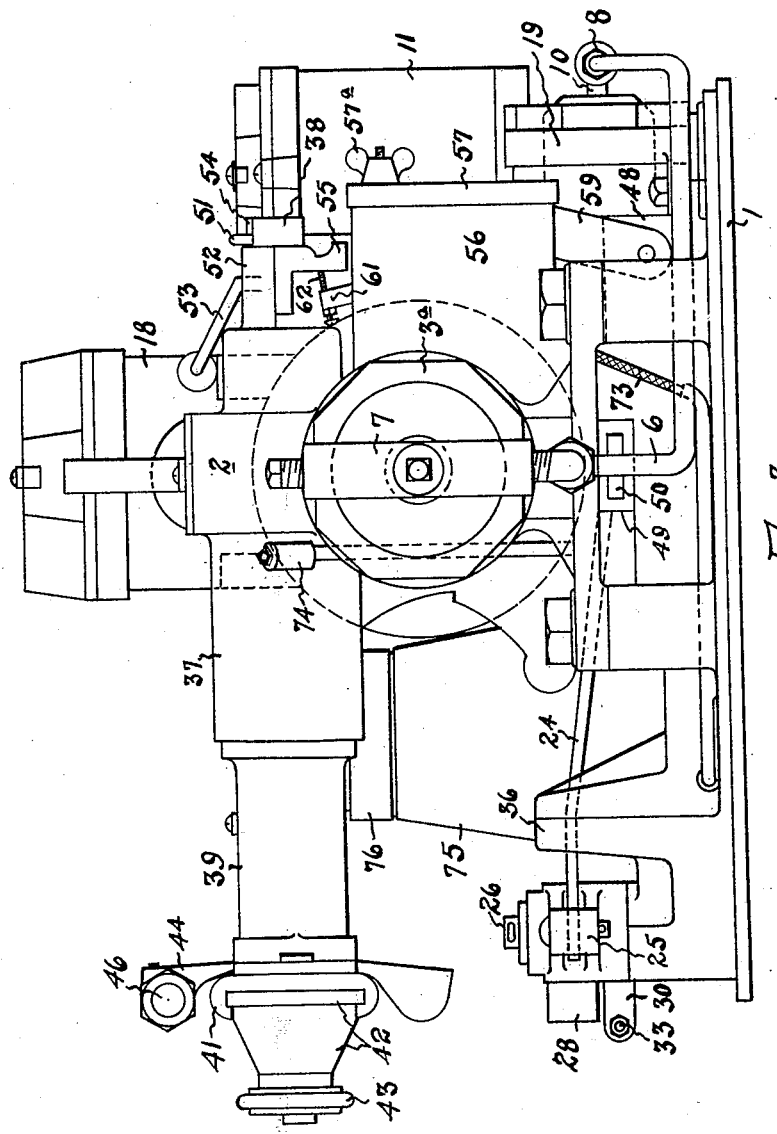
Fig. 3 is an end elevational view of this engine from the end opposite to that shown in Fig. 1.
Figure 4:
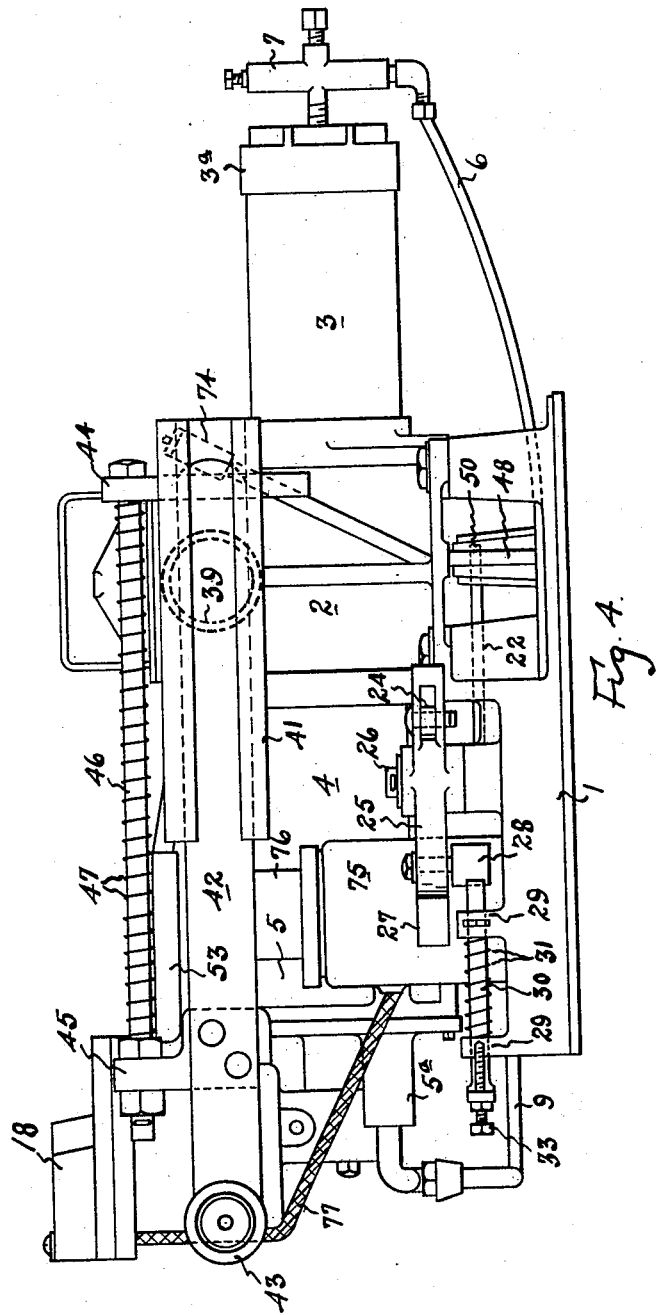
Fig. 4 is a side elevational view of this engine.

The central casing 2 is provided with a hub 37 within which is journaled a transverse shaft 38. One end of this shaft is provided with a collar 39 to which are secured the oppositely extending arms 40. Mounted on these arms is a channel 41 in cross-section clearly shown in Fig. 3 and in longitudinal form shown in Fig. 4. Slidably mounted in the channel 41 is a bar 42 which is provided on its outer end with a roller 43 which operates in the vertical channel 34. Secured to the bar 42, as is particularly clear from Fig. 4, are the bored lugs 44 and 45. Lug 44 is permanently secured to one of the arms 40 and lug 45 is permanently secured to the slidable bar 42. A rod 46 has a sliding fit with the hole in the lug 44 and is locked to lug 45 by means of locking nuts. A coil spring 47 is mounted on the rod 46 and resists sliding movement of bar 42 in channel 41 as is clear in Fig. 4.

Slidably mounted in a suitable trap formed in the base plate 1 is a sliding bar 48 which is provided with a recess 49 on its upper surface in which the rounded end 50 of lever 22 operates. The function of this bar will be described later.

Figure 5:
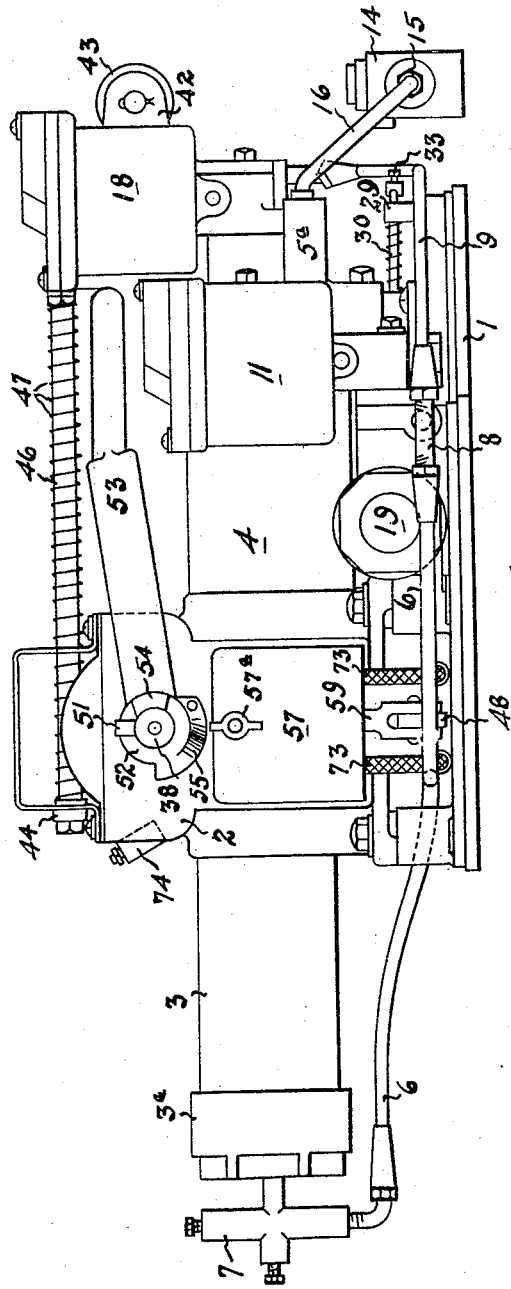
Fig. 5 is a side elevational view of this engine from the side opposite to that illustrated in Fig. 4.

Mounted on the projecting end of shaft 32 is a collar 52 provided with a handle 53. This collar is cut away to provide a lug 50 which moves in the path of a pin 51 permanently secured in the end of shaft 38. Collar 52 is provided with a depending cam 55 as shown in Figs. 3 and 5. At 56 is a switch casing provided with a removable cover 57 held in place by means of wing nut 57ª. The switch structure within this casing is clearly shown in Figs. 6, 7 and 8. A yoke 58 mounted on the central casing 2 provides a support for the pin 60 on which the lever 59 oscillates. The lever 59 is provided with an upwardly projecting extension 61 which is provided with an adjustable screw 62 which cooperates with the cam 55. Mounted on lever 59 and insulated therefrom is a contact pin 63 which may be moved into engagement with the resilient contacts 64 and 65 mounted on the insulating support 66. The contacts 64 and 65 are pivotally mounted on pins 68 mounted on the conducting supports 67. A pigtail 69 interconnects the contacts 64 and 65 with the supports 67 to provide good electrical contact therebetween. Studs 70 mounted on the supports 67 extend through the contacts 64 and 65 and are provided with springs 71 to hold the contacts in an outward position as shown in Fig. 8 against the stops 72 as shown. The wires 73 are connected to the supports 67 and extend to the circuits controlled by the switch as shown in detail in the above mentioned copending application. As shown in Fig. 6 lever 59 is pivotally connected to the slidable bar 48. At 74 is a suitable pipe connection by means of which oil may be introduced into the guide track or the sliding bar 48 to effect lubrication thereof. At 75 is a support formed on the base plate for a snap switch 76. A wire 77 extends from one of the terminals of the solenoid winding of magnet valve 18 to one of the contacts of the snap switch. The other terminal of this winding is grounded in usual practice. The wires 73 of the switch mechanism also extends to the snap switch 76 as shown in Fig. 2.

Figure 9:
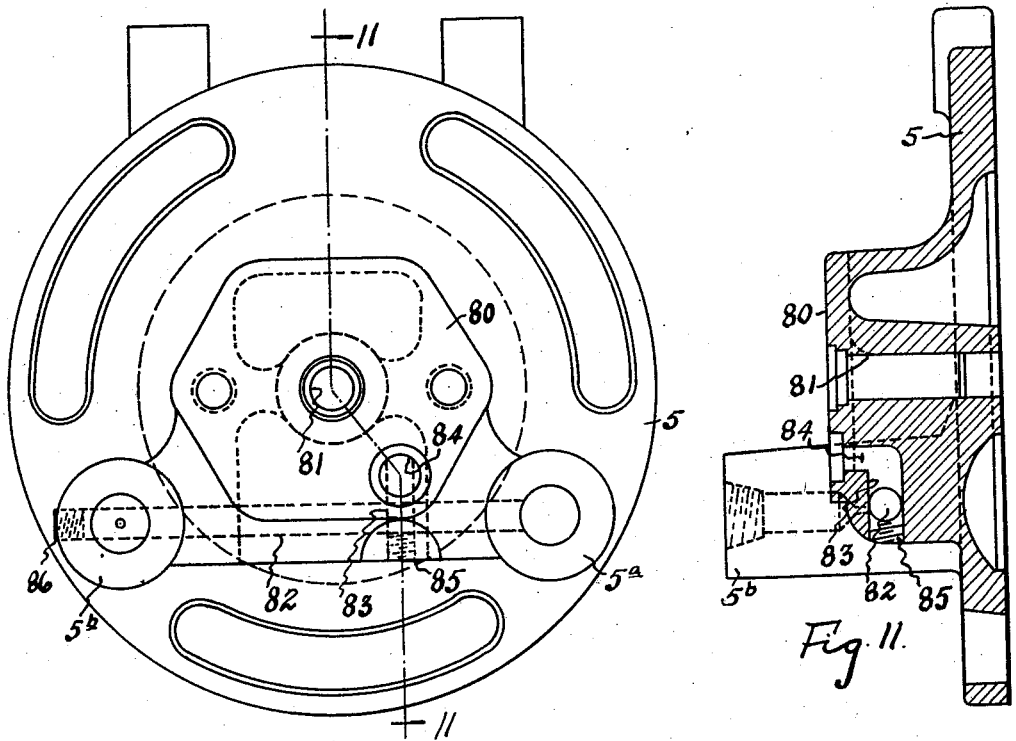
Fig. 9 is an elevational view of the large cylinder head.
Figure 10:
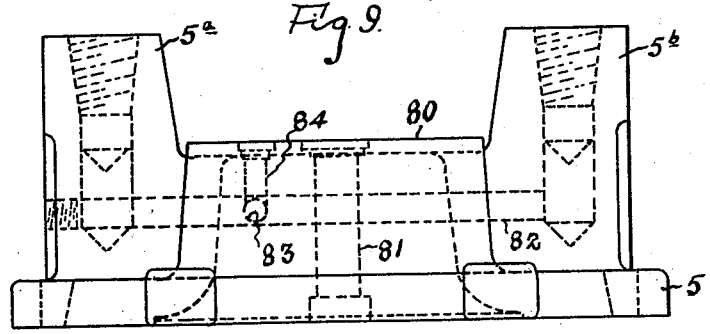
Fig. 10 is a side view of this head.

The cylinder head for the large cylinder 4 as shown in detail in Figs. 9, 10 and 11 consists of a suitably formed plate 5 provided with a seat 80 on the face thereof opposite to the base which is secured to the end of the cylinder. On this base is mounted magnet valve 18 which is formed with a complementary seat to fit thereon. The head is provided with a central passage 81 extending all the way therethrough so as to open into the cylinder when the head is applied thereto. Extending transversely between the bored nipples 5ª to 5ᵇ is a passage 82 which is closed by means of a plug 86. The passage is connected by a right angle passage comprising the portions 83 and 84. The portion 83 is closed by means of a plug 85. The portion 84 opens as shown in Fig. 9 through the seat 80.

The construction of the electro-magnet valves 18 and 11 is shown in detail in Figs. 12 and 13. Each valve comprises a casing 90 having an insulating covering 91. Within the casing is a suitably formed insulating spool 92 on which the solenoid winding 93 is mounted. The lower end of the spool is closed by means of a pole piece 96 in which a valve rod 97 is slidably mounted. At 94 is a slidable plunger attractable by the pole piece 96 when magnetized. The plunger may be manually operated by means of a pin 95 which extends through the cover. Both valves are of the same construction up to this point.

The casing 90 of valve 18 is provided with a bored extension 98 which is closed by a plug 99 provided with a passage 100 extending to the upper end thereof and provided with a conical seat as shown. Passage 100 is connected by passage 101 to a nipple 84′. The valve rod 97 is provided at its lower end with a valve 102 which cooperates with the seat on the plug 99. A spring 103 is provided to normally hold the rod in the position shown with valve 102 unseated. A central bored plug 104 is mounted within the extension as shown and it, likewise, is provided with a conical seat cooperating with a second valve on the valve stem. The space above the plug 104 is in communication with the atmosphere through the exhaust ports 106. The space between plugs 99 and 104 is connected to a nipple 81′ by passage 105. The left face of the extension of valve 18 provides a seat which rests against the seat 80 of the cylinder head 5. Nipple 81′ fits into port 81 and nipple 84′ fits into port 84.

The casing 90 of magnet valve 11 is also provided with a suitable bored extension 98 closed by a plug 99 which is connected by passages 107 to the nipple 10'. Within the extension is a central bored plug 108 provided with a conical seat at its lower end for cooperation with a valve mounted on the valve stem 97. The valve stem is normally held as before in the position shown by means of a spring 98. Another plug 109 is provided which is also centrally bored and provided with a conical seat on its upper surface which cooperates with a second valve on the valve stem. The space between plugs 108 and 109 is connected to nipple 12' by passage 110. Nipple 10' is connected to the pipe 10 of Fig. 2 and nipple 12' connects to the passage in connection 12 of Fig. 2.

Electro-magnet valve 18 is known in the art as the exhaust type and electro-magnet valve 11 is known in the art as the pressure type. Both of these valves are well known in various forms.

The internal construction of the engines is shown in Fig. 16. This construction is the same for both types. The transverse shaft 38 is shown extending through the casing 2 and provided with a segmental gear 38ª. Within the cylinders 3 and 4 are the pistons 123 and 124 rigidly united by a piston rod 125 which extends through openings in the casing 2. The upper surface of the piston rod is provided with gear teeth 126 which mesh with the teeth of the segmental gear 38ª. The piston rod is provided with a longitudinal bore which does not extend all the way therethrough, within which a small plunger 127 operates. Between this plunger and the bottom of the recess is a coil spring 128. The plunger is provided with an extending rod 129 to the outer end of which is secured a washered cup 130. A portion of the head 5 is provided with an upstanding seat 131 for cooperation with the washer on the rod 129. Passage 81 normally opens directly into cylinder 4 but when the washer seats on the edge of cup 130 it is only in communication with the interior of the cylinder through the restricted passage 81ª.

The operation of this device will now be described. Fluid pressure is supplied from a suitable source through valve 13, through pipe 16, through nipple 5ᵇ to passage 82 in cylinder head 5 and through this passage to nipple 5ª into pipes 9 and 6 so that fluid pressure is always connected to the smaller cylinder 3 in accordance with differential engine practice. Fluid pressure is also supplied through connection 10 to magnet valve 11 and through passage 107 into the space below plug 108 where it is normally trapped when electro-magnet valve 11 is de-energized which is the position shown in Fig. 13. Fluid pressure also flows from passage 82 through passages 83 and 84 to magnet valve 18 by the way of nipple 84' and passages 101 and 100. Valve 102 is normally unseated as shown in Fig. 12 so that fluid pressure flows on through the space between plugs 99 and 104 to passage 105 through nipple 81' and finally through port 81 in head 5 into the large cylinder 4. As a result the pressure being the same on both pistons and the piston in cylinder 4 being larger the parts of the engine are in the position shown in Fig. 16 and the various external parts connected thereto are in the position shown in Fig. 2 with the door closed and locked. At this time the switch in casing 56 is closed. Thus the signal lights or devices connected thereto are properly operated indicating that the door is both closed and locked. To open the doors the circuit to magnet valve 11 is first completed to energize the magnet valve winding. As a result plunger 94 moves downwardly engaging rod 97 causing the upper valve to move into contact with the seat on plug 109 and causing the lower valve to move off its seat on plug 108. Fluid pressure then flows through the passage in plug 108, passage 110, nipple 12' through connection 12 into lock cylinder 19 moving the piston forwardly. Since spring connection 20 is tightly coiled it acts as a rigid rod under compression causing lever 22 to operate in a counter-clockwise direction and locking lever 25 to operate in a clockwise direction in view of the link connection 24. Locking lever 25 thus moves down to horizontal position in Fig. 2 to a point where the cam lock 28 moves in back of the left projecting end of rod 30 to hold the locking lever out of the path of the door. The movement of lever 22 causes bar 48 to move downwardly from Fig. 2 or to the right in Fig. 7 moving contact pin 63 out of engagement with the contacts 64 and 65 to properly control the signal devices to indicate that the doors are at least unlocked if not open. Magnet valve 18 is then energized and as a result valve 102 is seated and the upper valve moves off its seat on plug 104. The supply of fluid pressure is thus cut off from the larger cylinder by the closing of passage 100 and the cylinder is open to atmosphere through passage 105, the valve at plug 104 and the exhaust passage at 106. Fluid pressure, of course, remains always on the smaller cylinder. As a result the pistons begin to move to the right, Fig. 16, causing the counter-clockwise rotation of shaft 38 with the result that arm 42 in Fig. 2 moves upwardly drawing the door to the left. The pistons continue to move to the right until the washered cup 130 seats on cup 131. The large exhaust passage 80 is then cut off and exhaust continues through the restricted passage 81ª into passage 81 to effect a slower operation of the engine near the end of its stroke. As a result the doors are not brought suddenly to a stop at the end of their stroke. To close and lock the doors both magnet valves which remain energized as long as the doors are open are de-energized. As a result lock cylinder 19 is open to exhaust through the exhaust ports 106 of valve 11 and the large cylinder 4 is cut off from exhaust and connected to the fluid pressure source. In other words, both valves 11 and 18 when de-energized return to the positions shown in Figs. 13 and 12. The pistons then move to the left until they reach the position shown in Fig. 16 at which time the doors are closed. Just as the doors reach the end of their closing stroke arm 35 on the rear edge of the door engages the bolt 33 on rod 30 and moves it to the right, Fig. 2, out of the path of the cam lug 28 loosening locking lever 25. In the meantime, however, the spring in locking cylinder 19 has returned the piston to normal position placing spring 20 under tension. As soon as rod 30 is moved out of the path of cam lug 28 spring 20 snaps the locking lever 25 back to normal and locking position and at the same time the switch in casing 56 is closed properly setting the signal in circuits.

If during closing operations the door strikes an object such as a passenger the engine may continue in its closing movement but the door will stop. This occurs because rod 42 slides in channel 41 to the rod in Fig. 4 comprising spring 47, rod 46 of course sliding through the support 44. When the pressure is removed from the door spring 47 returns the parts to normal position causing the door to close or to catch up with the movement of the motor. As is clear in Fig. 2 when the door is closed arm 35 is spaced some distance from locking lever 25 so that if a person gets caught in the door, or, if for any other desired reason, the door may be opened manually by pressure directly applied thereto for a distance equal to this space. In a practical system this space would be about 2½ inches so that each section of the door being manually movable this amount makes it possible to separate the sections of the doors 5 inches which is sufficient to permit the extraction of an arm or leg of a passenger if caught between the door sections.

If desired the door may be opened manually by means of lever 53. This is pulled upwardly in Fig. 2 causing lug 54 to engage pin 51 to effect rotation of shaft 38 in the same manner that it is rotated by the pistons. Limited movement can only be effected by lever 53 but this is sufficient to move arm 42 out of a horizontal and locking position so that when pressure is applied to the door it may be fully opened. The movement of collar 52 causes a corresponding movement of cam 55 which engages the pin 62 causing lever 59 to move to the right, Fig. 7, so that contact pin 63 moves away from contacts 64 and 65 to give the signal that the doors are unlocked and possibly, open. This movement of lever 59 also pulls bar 48 to the right and through levers 22 and 24 and causes locking lever 25 to move back out of locking position so that the door may be fully opened. This also places spring 20 under tension so that when the door is closed either by energizing valve 18, or by hand, locking lever 25 will move back to locking position when arm 35 engages screw 33 on rod 30 to release the locking lever. Thus, in a case of emergency, the door connected to the motor may be unlocked and opened manually and the parts set for proper closing operation.

*Center door engine*

The center door engine is, in many respects, quite similar in construction to the end door engine and for that reason all the corresponding parts have been given the same reference numerals. The additional features of the center door engine will now be described in connection with Figs. 14 to 20 inclusive. In this case the cylinder structure and the switch structure are the same as before. In this case, however, the locking lever 25 is omitted and the slidable bar 48 becomes the locking lever. In this case the sections of the center doors operated by the engine are provided with bars 113 and 114 as shown in Fig. 20. These bars are operated in guides 115 and 116 which are mounted adjacent the motor and, if desired, on the motor base. Slidable bar 48 which now becomes a locking bar is made somewhat longer as shown in Fig. 20 and has a notch cut at its upper end as shown at 48ª. When the doors are closed locking bar 48 moves into a position between the bars 113 and 114 so that the doors may not be opened because these bars will strike the locking bar 48. Mounted on the side of the engine on a stud 132 is a member having the two arms 133 and 134'. Arm 133 is positioned so that it may rest in the notch 48ª of the locking bar 48. Arm 134 is in the path of pin 135 mounted on the dependent arm 134 which is formed integral with the collar 39 to which the oppositely extending arms 40 are secured. As shown in Fig. 14 the arms 40 are connected by bars of links 111 and 112 to the door sections. As is clear in Fig. 19 a pin 136 is mounted on the motor casing and extends through arm 133 and is provided with a spring 136ª to normally cause counterclockwise rotation of the arms 133 and 134 on stud 132. As shown in Fig. 14 collar 52 is provided with an integral arm 117 to which a slidable rod 118 is pivotally connected. This rod passes through a hole in arm 119 which is formed integral with a sleeve 121 pivotally mounted in any suitable manner on the engine. This sleeve is also provided with an arm 122 which extends to a point so that it overlies the pin 95 of magnet valve 18. A spring 120 is mounted between lock nuts on rod 118 and rod 119 as is clear in Fig. 15. As before, bar 48 is pivotally connected to lever 59 to operate the switch.

In the operation of this form of engine magnet valve 11 is first energized as before so that lock cylinder 19 is supplied with air. As is clear in Fig. 20 as the piston moves downwardly the lever 22 moves in clockwise direction causing locking bar 48 to move upwardly to withdraw it from the path of bars 113 and 114. At the same time the switch is opened through lever 59. The doors are now unlocked and the proper signals are given to indicate the fact. Magnet valve 18 is then operated with the result that the engine is energized as before to open the doors. When the doors are fully open arm 134, Fig. 19, has moved in a clockwise direction so as to free arms 134' and 133 so that spring 136ª may rotate these arms in a counterclockwise direction. As soon as bar 48 is fully withdrawn the lower end of arm 133 drops into notch 48ª holding bar 48 locked in withdrawn position. To close the doors both magnet valves are de-energized. As a result lock cylinder 19 is open to exhaust and the spring therein moves the piston back to normal position placing spring 20 under tension. However, locking bar 48 cannot move back to its normal position, Fig. 20, because it is locked against movement by lever 133. The motor is, therefore, free to close the doors in a manner similar to that already described since air is supplied to the larger cylinder by the de-energization of magnet valve 18. Just as the doors are fully closed pin 135 on arm 134 strikes arm 134' causing clockwise rotation of that arm and arm 133 to move arm 133 out of the notch 48ª of bar 48. This permits spring 20 to snap the bar to the position shown in Fig. 20 and at the same time the switch is closed. The doors are now closed and locked and the proper signal is given.

This engine may likewise be operated by lever 53. In this case, however, the doors connected to the engines are not completely opened manually but magnet valve 18 is manually operated instead of by an electric current. The first upward movement of lever 53, Fig. 15, causes the switch in casing 56 to be opened as before through the agency of cam 55. At the same time locking bar 48 is withdrawn through its connection with lever 59. The movement of collar 52 through the movement of lever 53 causes the movement of rod 118 to the left, Fig. 15, causing lever 122 to dip downwardly and push the pin 95 of magnet valve 18 downwardly. As a result plunger 94 moves the valve rod 97 downwardly in the same manner as would occur if electro-magnet winding 93 is energized. As a result air is exhausted from the larger cylinder so that the pistons move to the right to open the doors. As before lever 133 may drop down into the notch 48ª to hold the locking bar 48 in withdrawn position. Thus whereas in the end door engines the lever 53 itself operates the parts in the center door engines it merely manually unlocks the doors and mechanically operates the electro-magnet valve 18 so that the engine will be operated by fluid pressure. In an emergency if fluid pressure is not available the doors may be manually unlocked with the center door form of engine freeing the doors so that they may be opened by hand.

In view of the above disclosure it will be apparent that my invention resides in certain principles of construction and operation which may be carried out in other physical forms and I do not, therefore, desire to be strictly limited to the disclosure as given for purposes of illustration but rather to the scope of the appended claims.

What I seek to secure by United States Letters Patent is:

1. In a combination as described, a movable door, a motive device having an operating member for operating the door, connecting links between the operating member of the motive device and the door movable to a position when the door is closed for preventing opening of the door when pressure is applied directly thereto, means for locking the door in closed position, and manual means connected to said operating member and locking means for unlocking the door and moving the links sufficiently to permit the opening of the door.

2. In a combination as described, a movable door, a motive device for operating the door, connecting links between the motive device and the door movable to a position when the door is closed for preventing opening of the door when pressure is applied directly thereto, means for locking the door in closed position, manual means connected to said links and locking means for unlocking the door and moving the links sufficiently to permit the opening of the door, and means forming part of the link connection for allowing limited movement of the door when pressure is applied thereto.

3. A combination as described, comprising a pneumatic motor, a door, a connection between the motor and the door, a locking lever, a lock cylinder and piston, a resilient connection between the lock piston and the locking lever, means for supplying compressed air to the lock cylinder and for exhausting the air therefrom, and means cooperating with the locking lever for holding it in unlocking position when operated by supplying compressed air to the lock cylinder, said spring connection being placed under tension when air is exhausted from the lock cylinder so that when the locking lever is released the spring connection returns it to locking position.

4. A combination as described, comprising a pneumatic motor, a door, a connection between the motor and the door, a locking lever for locking the door in closed position, motive means for operating the locking lever, a spring connection between the motive means and the locking lever, means cooperating with the locking lever for holding it in unlocking position, said spring being under tension when the locking lever is held in unlocking position and the motive means is deenergized, and means on the door and cooperating with said means to release the locking lever as the door approaches closed position whereby said spring returns the locking lever to locking position.

5. A combination as described, comprising a pneumatic motor, a door, a connection between the motor and the door, a bar attached to the door, a locking lever mounted in the path of movement of said bar, means including a spring connection for moving the locking lever out of the path of said bar when pressure is applied to said spring, and means cooperating with the locking lever for holding it in withdrawn position against the pull of said spring connection produced by the return of said means to normal position.

6. A combination as described, comprising a pneumatic motor, a door, a connection between the motor and the door, a bar attached to the door, a locking lever mounted in the path of movement of said bar, means including a spring connection for moving the locking lever out of the path of said bar, means for holding the locking lever in unlocking position, said spring being under tension when said means returns to normal position, and means operated by said pneumatic motor for releasing the locking means so that the spring connection returns the locking bar to locking position when the door is substantially closed.

7. A combination as described, comprising a pneumatic motor, a door, a connection between the motor and the door, a member attached to the door, a locking lever mounted in the path of movement of said member to lock the door closed, electro-pneumatic means for withdrawing the locking lever out of the path of said member, means for holding the locking lever in withdrawn position, and manual means for withdrawing the locking lever out of the path of said member, said electro-pneumatic means including a spring connection to the locking lever for returning the locking lever when released to locking position whether withdrawn either by the electro-pneumatic means or the manual means.

8. The combination as described, comprising a pneumatic motor, two doors arranged to move towards each other in opening, connections between the motor and the doors, bars attached to the adjacent edges of the doors, a locking lever arranged to lie between the ends of the bars to lock the doors closed, and means for withdrawing the locking lever to unlock the doors before the motor operates.

9. The combination as described, comprising a pneumatic motor, two doors arranged to move in opposite directions, connections between the motor and the doors, bars attached to the doors, a locking lever arranged to be in the path of movement of the bars to lock the doors closed, means for withdrawing the locking lever to unlock the doors, spring means for returning the locking lever to locking position, means for holding the locking lever withdrawn holding said spring means under tension, and means operated by the pneumatic motor and cooperating with the locking means for releasing the locking bar so that the tension spring may return it to locking position when the motor moves the doors substantially to closed position.

10. A combination as described comprising a pair of doors slidable towards each other into overlapping relation when open, a motive device including a pair of aligned cylinders, connected pistons in said cylinders, a door operating member movable by said pistons, connections between said operating member and said doors, a bar mounted on each of said doors on opposing edges, a locking bar mounted to slide between the ends of said bars to lock the doors closed, pneumatic means for withdrawing the locking lever from locking position, and connections for supplying fluid pressure to said pneumatic means when it is supplied to said motive device.

11. In an apparatus for the type described, the combination comprising a pneumatic motor, a slidable door section, a connection between the motor and the door, a locking lever movably mounted in the path of the door, electro-pneumatic means for operating the locking lever out of the path of the door, a closely wound spring connecting the electro-pneumatic means to the locking lever, whereby under pressure when moving the locking lever to unlocking position the spring is rigid, and means for holding the locking lever in unlocking position, said spring being under tension when the electro-pneumatic means returns to normal position while the locking lever remains in unlocking position.

In testimony whereof I have hereunto set my hand on this 21st day of July A. D., 1931.

PARIS R. FORMAN.